June 20, 1967 H. P. MATTLI 3,326,338
COMBINED HYDRAULIC COUPLING AND FRICTION
CLUTCH POWER TRANSMISSION
Filed Oct. 23, 1965 2 Sheets-Sheet 2

INVENTOR:
HANS PETER MATTLI
BY:
James E. Nilles
ATTORNEY

United States Patent Office 3,326,338
Patented June 20, 1967

3,326,338
COMBINED HYDRAULIC COUPLING AND FRICTION CLUTCH POWER TRANSMISSION
Hans Peter Mattli, Langnau in Emmental, Switzerland, assignor to Twin Disc Clutch Company, Racine, Wis., a corporation of Wisconsin
Filed Oct. 23, 1965, Ser. No. 503,524
6 Claims. (Cl. 192—3.3)

ABSTRACT OF THE DISCLOSURE

A power transmission including a fluid coupling in combination with a hydraulically actuated friction clutch, and having a sleeve connected to the fluid coupling for defining, at least in part, a plurality fluid passages to the coupling and clutch.

---

The present invention relates to a power transmission of the type combining a torque converter or other fluid coupling and a hydraulically operated friction clutch of the modulating type.

Power transmissions of this general type have heretofore been used with some degree of commercial success; but they have certain shortcomings. In that type of prior art transmission having the clutch located ahead of the torque converter in respect to the axial direction from which input power is received, a considerably long, large diameter and otherwise awkward transmission was necessary due to the need for complicated and long fluid passages, power drive train to the fluid pump, necessary supporting structures and partitions for the clutch and fluid pump, and a multiplicity of oil seals and collectors.

Accordingly, the present invention provides a particularly compact power transmission having a hydraulically actuated friction clutch nested on the axial side of the torque converter or other fluid coupling (the terms being used interchangeably herein) opposite to that from which the power is received. The clutch is thus "behind" the converter, but the power goes through the clutch prior to entering the torque converter. The arrangement is such that the clutch is located compactly within the radial dimension of the converter, and the rotating housing of the converter forms part of and drives the clutch. The clutch then drives the remaining portion of the torque converter and output member.

Another aspect of the present invention relates to a transmission of the type mentioned immediately above, which has a novel arrangement of three separate fluid passages. More specifically, the non-rotatable stator of the converter has an axially long sleeve by which it is mounted around the power output shaft, and the fluid passages are defined by this long sleeve together with a steel tube which is pressed in the internal diameter of the sleeve. The result is the ability to form the sleeve and passages therein by casting the same, and thus effecting a minimum number of seal and collectors, relatively short passages, compact design and economy in manufacture.

The present invention provides a torque converter and hydraulic friction clutch power transmission wherein the clutch is compactly nested axially behind the torque converter in respect to the axial direction of power transmission, and this clutch is driven by the rotating housing of the converter; a more specific aspect of the invention relates to a transmission of this type wherein the stator has a long sleeve-like hub through which fluid for the converter is introduced and exhausted and actuating fluid for the clutch is also introduced.

Generally, the present invention provides a torque converter and friction clutch power transmission of compact and efficient design which is comparatively economical to manufacture.

These and other objects and advantages of the present invention will appear hereinafter as this disclosure progresses, reference being had to the accompanying drawings, in which.

Figure 1:
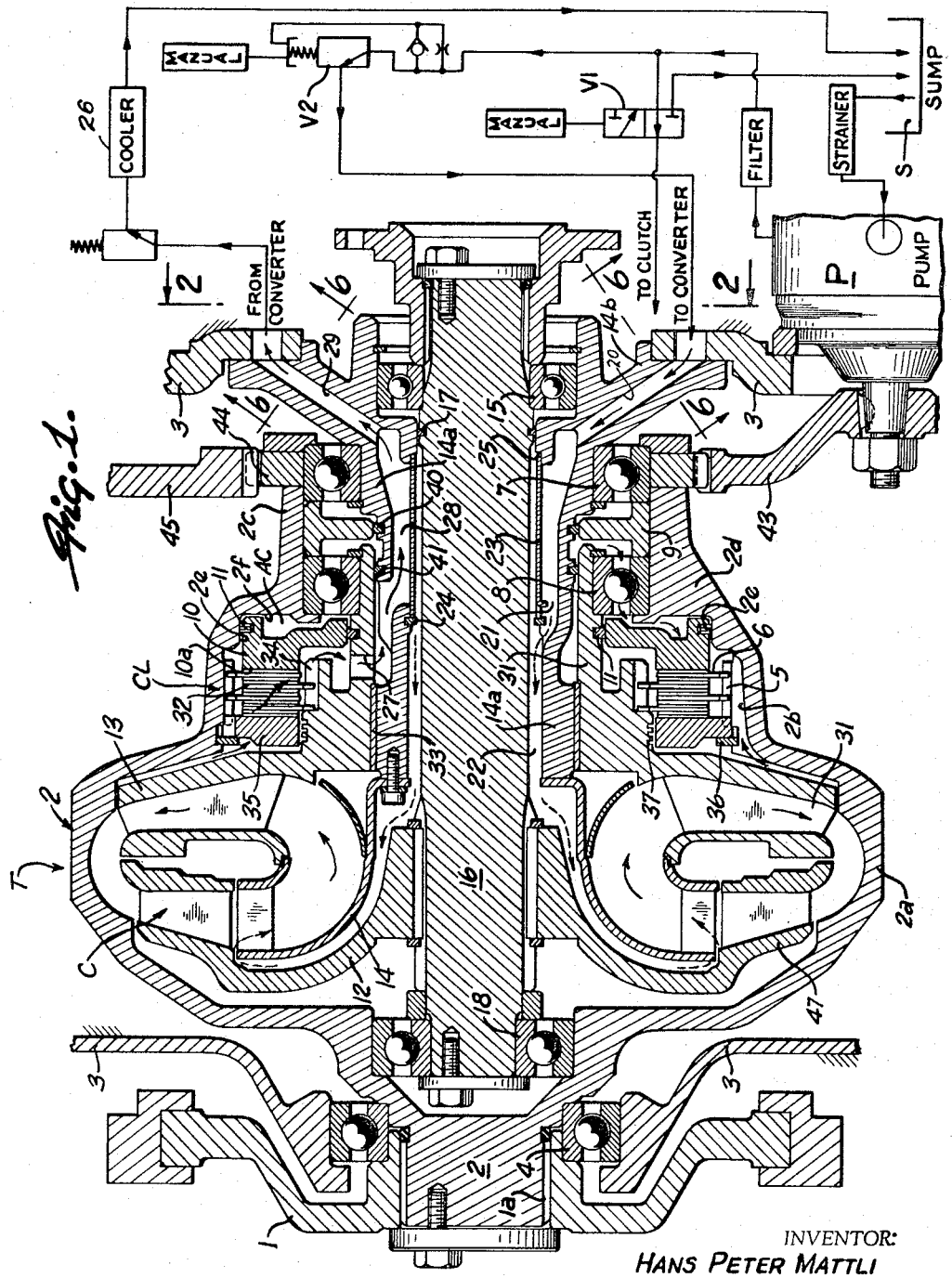
FIGURE 1 is a longitudinal sectional view through a power transmission embodying the present invention, the view being taken along line 1—1 in FIGURE 2, certain parts shown as being broken away or removed for the sake of clarity in the drawings, and including a schematic diagram of the control circuit.

Referring in greater detail to the drawings, the power from a source such as an engine (not shown) can be delivered in a number of ways, such as through a driving ring and an input spider 1 as shown in FIGURE 1, and drivingly connected to or part of the rotating housing 2 of the torque converter T. Other input arrangements, such as flexible couplings or universal joints (not shown) could be employed. The input arrangement and housing are splined together at 1a and are rotatably mounted in the stationary frame 3 on anti-friction bearing assembly 4. The housing in turn drives the clutch CL which in turn drives the torque converter impeller, as will appear.

The housing 2 has been shown as of simplified construction, that is to say, in practice it would actually consist of several parts suitably connected together as a unit and which would permit manufacture, assembly and disassembly of the various parts. However, for clarity of the drawings and visualizing the structure and operation, certain parts such as this housing have been shown as of one piece construction.

The housing 2 includes a diametrically enlarged portion 2a which forms part of the fluid chamber C; and a cylindrical intermediate portion 2b located axially behind the chamber C (in respect to the location of the power input) and closely adjacent thereto and on which are formed internal splines 5 for mounting clutch plates 6, as will be more fully referred to. The housing 2 also includes a rear, axially extending hub portion 2c by which the rear of the housing is rotatably supported by anti-friction bearing assemblies 7 and 8. A spacer 9 is fixed between assemblies 7 and 8.

A housing portion 2d, located axially between hub portion 2c and cylindrical portion 2b, has an internal cylindrical surface 2e and also a radial surface 2f. These surfaces together with other parts to be described define a friction clutch actuating chamber AC for a clutch engaging piston 10. The piston has conventional fluid seals 11 and a clutch plate engaging surface 10a. The piston is urged to the clutch engaging position by pressure fluid in the chamber AC and is released simply by the internal pressure of the torque converter. The torque converter also includes a turbine 12 fixed to shaft 16, and an impeller 13 mounted in a manner to be described later.

Thus the rotatable housing of the torque converter is of an axial length and radial dimension so that it surrounds and encloses the torque converter, friction clutch CL and other parts to be described.

It will also be noted that the clutch is radially within the torque converter. As shown, the clutch is only about one-half the diameter of the torque converter and is nestled compactly next to the impeller 13 and within the rotating housing. The rotating housing itself forms the major portion of the cylinder chamber AC for the piston 10.

The torque converter also includes a reaction member in the form of a stationary stator 14 which includes an axially long sleeve 14a that terminates in a radially extending rear flange 14b. The latter is mounted by anti-friction bearing assembly 15 on the rotatable output shaft 16. A rotating seal 17 is provided between shaft 16 and sleeve 14a. The front end of the output shaft is rotatably piloted in anti-friction bearing assembly 18 mounted in the front portion of the rotating housing 2. There is thus provided a fluid coupling having a rotatable housing and a plurality of bladed coupling members within said housing and together therewith defining a chamber for working fluid for transmitting rotation from one member to another. Means are provided at one axial end of the housing for rotating the latter, and a hydraulically actuated friction clutch is located immediately adjacent to and radially within the coupling and on the side of the coupling which is axially opposite from the drive means.

The stator sleeve 14a is formed as a casting and defines three separate fluid passages. A steel tube 23 is press fit into the internal diameter of the sleeve 14a and held axially in place by snap ring 24 and shoulder 25. It is by the use of this steel tube 23 being pressed into the sleeve casting that it is possible to utilize the casting for these multiple passages.

Figure 5:
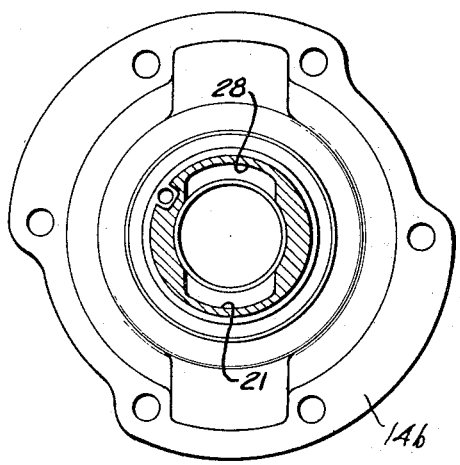
FIGURE 5 is a transverse sectional view taken along line 5—5 in FIGURE 4.
Figure 4:
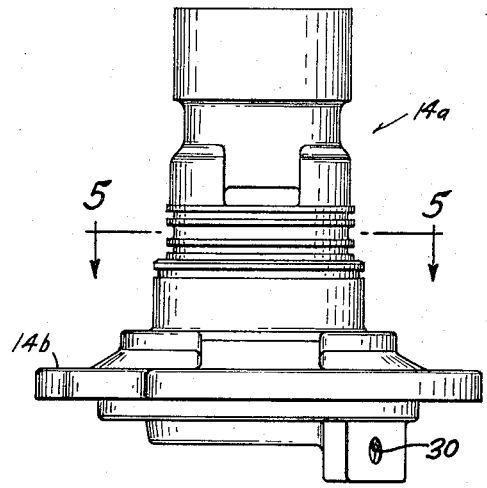
FIGURE 4 is a plan view taken along line 4—4 in FIGURE 2.
Figure 6:
FIGURE 6 is a sectional view taken along line 6—6 in FIGURE 1.
Figure 7:
FIGURE 7 is a sectional view taken along line 7—7 in FIGURE 3.

The first of these passages is for introducing cooling fluid from the pump P and into the torque converter. This passage is defined by a generally radial passage 20 (FIGURES 1 and 2) formed in flange 14b and which is in communication with axial passage 21 (FIGURES 1 and 5) formed along the interior of the sleeve 14a. This inlet passage then communicates with the annular space 22 between shaft 16 and sleeve 14a so that the oil flows as indicated by the dotted line arrows, into the torque converter.

The second passage conducts the oil out of the converter where it then enters the cooler 26 and then enters the sump S. The oil leaves the converter, as indicated by the solid line arrows in FIGURE 1, through the friction plate clutch CL, radial ports 27, then enters the axial passage 28 (FIGURES 1 and 5) formed along the interior of the sleeve passage 28 then communicates with a generally radial port 29 in the flange portion of the sleeve. This exhaust fluid then enters the cooler 26 and cooling of the converter and hydraulically actuated friction clutch is done in series and within a closed circuit system.

Figure 2:
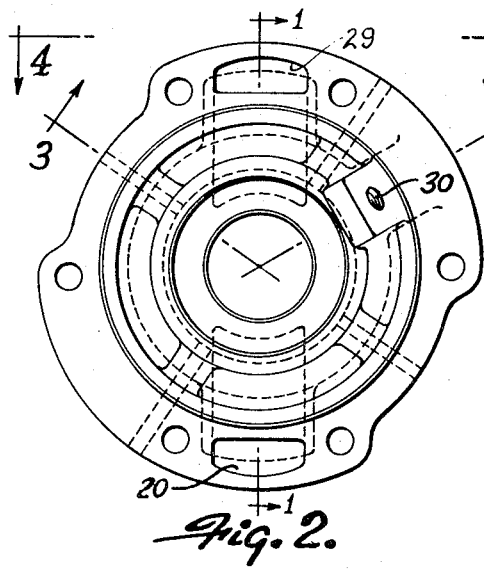
FIGURE 2 is an end view taken generally along line 2—2 of FIGURE 1, and showing the sleeve containing fluid passages.
Figure 3:
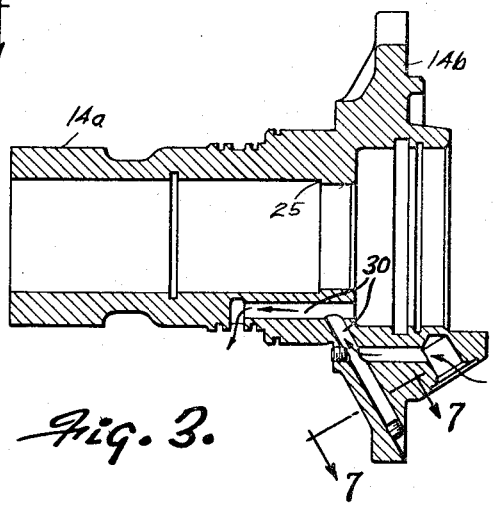
FIGURE 3 is a sectional view taken along line 3—3 in FIGURE 2.

The third passage 30 formed in the sleeve 14a is shown in FIGURES 2 and 3 and is for the purpose of conducting pressure fluid from the pump P and either the manual valve V1 or automatic and manual valve V2 and then through the anti-friction bearing assembly 8 and into the friction clutch actuating chamber AC, previously described.

Thus by the use of the sleeve and steel tube construction, a plurality of short fluid passages are provided for the torque converter and clutch actuating chamber.

The torque converter impeller 13 is rotatably mounted by its long hub 31 on bushing 33 on sleeve 14a. The hub 31 has external clutch splines 34 on which are mounted clutch plates 32 which interleave in the conventional manner with clutch plates 6. The clutch CL also includes a conventional back up plate 35 fixed by snap ring 36. A labyrinth or a rotating seal 37 is provided between plate 35 and the impeller 13.

The hub 31 is journalled for rotation relative to the housing 2 by means of the anti-friction bearing assembly 8, previously mentioned.

Thus the impeller 13 is rotatably mounted by its long hub 31 on the stator sleeve 14a and the clutch CL is located between the impeller and the housing for forming a releasable connection therebetween.

Suitable snap rings and fluid seals are provided in accordance with conventional practice, but it will be noted that it is necessary to use only three fluid seals of the rotating type, that is to say, between continually rotating parts. These three seals are the previously mentioned seal 17, a seal 40 located between the spacer 9 and sleeve portion 14a, and a seal 41 located between the hub 31 and sleeve portion 14a.

The fluid pump P is secured to the stationary frame 3 and its gear 43 is in constant driving mesh with a large ring gear 44 fixed to the rear end of the housing 2. Gear 44 is also used to take off power through another gear 45. The pump is thus driven simply from the rotating housing 2 at direct engine speed and without the need for an elaborate drive train, and the pump in turn can readily furnish pressure fluid to the transmission via the adjacent and relatively short passages previously described without the need for long passages, numerous seals and collectors. Generally, by locating the pump at the rear of the transmission, and the clutch behind the torque converter, an axially shorter and more compact transmission is provided.

The power flow through the transmission is from the engine through the converter input arrangement 1, rotating housing 2, friction plate clutch CL located on the axially opposite side of the housing 2 from the flywheel or source of power, then through the impeller 13, stationary stator 14, turbine 12 and output shaft 16.

Various modes of carrying out the invention are contemplated as being within the scope of the following claims particularly pointing out and distinctly claiming the subject matter which is regarded as the invention.

I claim:

1. A power transmission comprising, a fluid coupling having a rotatable housing and a plurality of bladed coupling members within said housing and together therewith defining a chamber for working fluid for transmitting rotation from one member to another, means at one axial end of said housing for rotatably driving the latter, a hydraulically actuated friction plate clutch located immediately adjacent to and radially within said coupling and on the side of said coupling which is axially opposite from said means, said clutch being driven by said housing and drivingly connecting the latter to said one member, and an output shaft concentrically arranged within said housing and driven by said coupling, one of said members having an axially long sleeve by which it is nonrotatably mounted around said shaft, said sleeve defining at least in part three separate fluid passages for supplying and exhausting said chamber and for supplying fluid to actuate said clutch.

2. A combination torque converter and a hydraulically operated friction plate clutch power transmission comprising, a torque converter having a rotatable housing and an impeller, a turbine and a stator within said housing and together therewith defining a working fluid chamber for transmitting rotation from said impeller to said turbine, means at one axial end of said housing for rotatably driving the latter, a clutch located immediately adjacent to and radially within said torque converter and on the side of said converter which is axially opposite from said means, said clutch being driven by said housing and drivingly connecting the latter to said impeller, and an output shaft concentrically arranged within said housing and said turbine being connected to said output shaft, said stator having an axially long sleeve by which it is nonrotatably mounted around said shaft, said sleeve defining at least in part three separate fluid passages for supplying and exhausting said chamber and for supplying fluid to actuate said clutch.

3. A power transmission comprising a torque converter having a rotatable housing and an impeller, a turbine and a stator within said housing and together therewith defining a chamber for working fluid for transmitting rotation from said impeller to said turbine, driving means at one axial end of said housing for rotatably driving the latter, a hydraulically actuated friction plate clutch located immediately adjacent to and radially within said torque converter and on the opposite axial side from said driving means, said clutch being driven by said housing and drivingly connecting the latter to said impeller, an output shaft concentrically arranged within said housing and said turbine connected to said output shaft, said stator having an axially long, cast metal sleeve by which it is nonrotatably mounted around said shaft, said sleeve defining at least in part a plurality of separate fluid passages extending generally lengthwise thereof and for supplying and exhausting said chamber and for supplying fluid to actuate said clutch, and a steel tube press fit into the internal diameter of said stator sleeve and defining therewith at least some of said passages.

4. A combination torque converter and a hydraulically operated friction plate clutch power transmission comprising, a torque converter having a rotatable housing and an impeller, a turbine and a stator within said housing and together therewith defining a working fluid chamber for transmitting rotation from said impeller to said turbine, means at one axial end of said housing for rotatably driving the latter, a clutch located immediately adjacent said torque converter and on the opposite axial side from said means, said clutch being driven by said housing and drivingly connecting the latter to said impeller, an output shaft concentrically arranged within said housing and said turbine being connected to said output shaft, said stator having an axially long sleeve extending axially therefrom and terminating in a radially flanged end, said sleeve defining at least in part three separate fluid passages for supplying and exhausting said chamber and for supplying fluid to actuate said clutch, and a fluid pump located at said end of said sleeve for supplying fluid to said passages.

5. A power transmission comprising a torque converter having a rotatable housing and an impeller, a turbine and a stator within said housing and together therewith defining a chamber for working fluid for transmitting rotation from said impeller to said turbine, driving means at one axial end of said housing for rotatably driving the latter, a hydraulically actuated friction plate clutch located immediately adjacent to and radially within said torque converter and on the opposite axial side from said driving means, said clutch being driven by said housing and drivingly connecting the latter to said impeller, an output shaft concentrically arranged within said housing and said turbine being connected to said output shaft, said stator having an axially long, cast metal sleeve extending axially therefrom and terminating in a radially flanged end by which it is nonrotatably mounted around said shaft, said sleeve defining at least in part a plurality of separate fluid passages extending generally lengthwise thereof and for supplying and exhausting said chamber and for supplying fluid to actuate said clutch, a steel tube press fit into the internal diameter of said stator sleeve and defining therewith at least some of said passages, and a fluid pump located at said sleeve end for supplying fluid to said passages.

6. A power transmission comprising, a fluid coupling having a rotatable housing and a plurality of bladed coupling members within said housing and together therewith defining a chamber for working fluid for transmitting rotation from one member to another, means at one axial end of said housing for rotatably driving the latter, a hydraulically actuated friction plate clutch immediately adjacent to and radially within said coupling and on the side of said coupling which is axially opposite from said means, said clutch being driven by said housing and drivingly connecting the latter to one member, an output shaft concentrically arranged within said housing and driven by said coupling, one of said members having an axially long sleeve extending axially therefrom and terminating in a radially flanged end by which it is nonrotatably mounted around said shaft, said sleeve defining at least in part a plurality of separate fluid passages extending generally axially thereof and for supplying and exhausting said chamber and for supplying fluid to actuate said clutch, a steel tube press fit into the internal diameter of said sleeve and defining therewith at least some of said passages, and a fluid pump located at said sleeve end for supplying fluid to said passages.

References Cited

UNITED STATES PATENTS

| 2,045,615 | 6/1936 | Rosle et al. | 192—3.29 |
|---|---|---|---|
| 2,226,802 | 12/1940 | Black | 192—3.3 |
| 2,712,285 | 7/1955 | Jandasek | 103—115 |
| 2,888,842 | 6/1959 | Ahlen | 192—3.3 X |
| 2,908,223 | 10/1959 | Buchi | 103—115 |
| 2,969,131 | 1/1961 | Black et al. | 192—3.3 X |
| 3,043,161 | 7/1962 | Tuck. | |
| 3,096,613 | 7/1963 | Winchell et al. | 60—54 X |
| 3,147,595 | 9/1964 | Liang | 60—54 |

MARK NEWMAN, *Primary Examiner.*

ARTHUR T. McKEON, *Examiner.*